United States Patent
Kight et al.

(10) Patent No.: US 7,107,244 B2
(45) Date of Patent: Sep. 12, 2006

(54) BILL PAYMENT SYSTEM AND METHOD WITH MERCHANT INFORMATION

(75) Inventors: Peter J. Kight, Alpharetta, GA (US); Mark A. Johnson, Dublin, OH (US); Tamara K. Christenson, Gahanna, OH (US); Regina Lach, Dublin, OH (US); Philip Pointer, Columbus, OH (US); Kenneth Cook, Gahanna, OH (US)

(73) Assignee: CheckFree Corporation, Norcross, GA (US)

( * ) Notice: Subject to any disclaimer, the term of this patent is extended or adjusted under 35 U.S.C. 154(b) by 639 days.

(21) Appl. No.: 09/877,192

(22) Filed: Jun. 11, 2001

(65) Prior Publication Data

US 2001/0044776 A1 Nov. 22, 2001

Related U.S. Application Data

(63) Continuation of application No. 09/250,675, filed on Feb. 16, 1999, which is a continuation of application No. 08/372,620, filed on Jan. 13, 1995, now Pat. No. 5,873,072, which is a continuation of application No. 07/736,071, filed on Jul. 25, 1991, now Pat. No. 5,383,113.

(51) Int. Cl.
*G06F 17/60* (2006.01)

(52) U.S. Cl. .................................................. 705/40

(58) Field of Classification Search ............. 705/35–40
See application file for complete search history.

(56) References Cited

U.S. PATENT DOCUMENTS

| | | | |
|---|---|---|---|
| 3,761,682 A | 9/1973 | Barnes et al. | |
| 3,833,885 A | 9/1974 | Gentile et al. | |
| 3,876,864 A * | 4/1975 | Clark et al. | 235/379 |
| 3,949,364 A | 4/1976 | Clark et al. | |
| 4,270,042 A | 5/1981 | Case | |
| 4,321,672 A | 3/1982 | Braun et al. | |
| 4,484,328 A | 11/1984 | Schlafly | |
| 4,642,767 A * | 2/1987 | Lerner | 705/30 |
| 4,649,563 A | 3/1987 | Riskin | |
| 4,734,858 A | 3/1988 | Schlafly | 364/408 |
| 4,745,559 A | 5/1988 | Willis et al. | 364/514 |
| 4,758,714 A | 7/1988 | Carlson et al. | |
| 4,791,561 A * | 12/1988 | Huber | 707/1 |
| 4,799,156 A | 1/1989 | Shavit et al. | |

(Continued)

FOREIGN PATENT DOCUMENTS

JP 401195573 A * 8/1989

(Continued)

OTHER PUBLICATIONS

Eliason, A.L. Online Business Computer Applications: 2nd Edition. Science Research Associates, 1897. HF5548.2.E427. pp. 18-19 and 69-71.*

(Continued)

*Primary Examiner*—Hyung Sough
*Assistant Examiner*—Jason Borlinghaus
(74) *Attorney, Agent, or Firm*—Sutherland Asbill & Brennan LLP

(57) ABSTRACT

A computerized payment system by which a consumer may instruct a service provider by telephone, computer terminal, or other telecommunications methods to pay various bills without the consumer having to write a check for each bill. The system operates without restriction as to where the consumer banks and what bills are to be paid. The service provider collects consumers' information, financial institutions information and merchant information and arranges payment based on a financial risk analysis to the merchants according to the consumers instructions.

15 Claims, 7 Drawing Sheets

U.S. PATENT DOCUMENTS

| | | | |
|---|---|---|---|
| 4,823,264 | A | 4/1989 | Deming |
| 4,882,675 | A | 11/1989 | Nichtberger et al. ........ 364/401 |
| 4,929,818 | A | 5/1990 | Bradbury et al. |
| 4,947,028 | A | 8/1990 | Gorog |
| 4,948,174 | A | 8/1990 | Thomson et al. |
| 4,960,981 | A | 10/1990 | Benton et al. |
| 4,961,139 | A * | 10/1990 | Hong et al. ..................... 707/1 |
| 4,974,878 | A | 12/1990 | Josephson .................... 283/67 |
| 5,007,084 | A | 4/1991 | Materna et al. |
| 5,025,373 | A | 6/1991 | Keyser, Jr. et al. |
| 5,093,787 | A | 3/1992 | Simmons |
| 5,097,115 | A | 3/1992 | Ogasawara et al. |
| 5,111,395 | A | 5/1992 | Smith et al. |
| 5,121,945 | A | 6/1992 | Thomson et al. |
| 5,220,501 | A * | 6/1993 | Lawlor et al. ................ 705/40 |
| 5,237,159 | A | 8/1993 | Stephens et al. |
| 5,265,008 | A | 11/1993 | Benton et al. .............. 364/408 |
| 5,283,829 | A | 2/1994 | Anderson |
| 5,303,149 | A | 4/1994 | Janigian |
| 5,326,959 | A | 7/1994 | Perazza |
| 5,336,870 | A | 8/1994 | Hughes et al. |
| 5,383,113 | A | 1/1995 | Kight et al. ................ 364/401 |
| 5,420,405 | A | 5/1995 | Chasek |
| 5,465,206 | A | 11/1995 | Hilt et al. |
| 5,496,991 | A | 3/1996 | Delfer, III et al. .......... 235/379 |
| 5,504,677 | A | 4/1996 | Pollin |
| 5,652,786 | A | 7/1997 | Rogers |
| 5,677,955 | A | 10/1997 | Doggett et al. |
| 5,699,528 | A | 12/1997 | Hogan |
| 5,710,889 | A | 1/1998 | Clark et al. |
| 5,727,249 | A | 3/1998 | Pollin |
| 5,794,221 | A | 8/1998 | Egendorf |
| 5,873,072 | A | 2/1999 | Kight et al. .................. 705/40 |
| 5,884,288 | A | 3/1999 | Chang et al. |
| 5,920,847 | A | 7/1999 | Kolling et al. |
| 5,920,848 | A | 7/1999 | Schutzer et al. |
| 5,956,700 | A | 9/1999 | Landry |
| 5,966,698 | A | 10/1999 | Pollin |
| 5,974,146 | A | 10/1999 | Randle et al. |
| 5,978,780 | A | 11/1999 | Watson |
| 6,029,150 | A | 2/2000 | Kravitz |
| 6,032,133 | A | 2/2000 | Hilt et al. |
| 6,044,362 | A | 3/2000 | Neely |
| 6,098,053 | A | 8/2000 | Slater |
| 6,188,994 | B1 | 2/2001 | Egendorf |
| 6,311,170 | B1 | 10/2001 | Embrey |
| 6,317,745 | B1 | 11/2001 | Thomas et al. |
| 2001/0037295 | A1 | 11/2001 | Olsen |
| 2002/0002537 | A1 | 1/2002 | Bastiansen |
| 2003/0208445 | A1 | 11/2003 | Compiano |
| 2004/0015413 | A1 | 1/2004 | Abu-Hejleh et al. |

FOREIGN PATENT DOCUMENTS

| | | |
|---|---|---|
| WO | WO 91/09370 | 6/1999 |

OTHER PUBLICATIONS

Article, "Pay your Bills the PC way", ST. Louis Post Dispatch (SL0-Monday, Jul. 31, 1989; Magid, Lawrence J; Five Star section; Monday's Business Section; p. 18; extracted on Internet from Dialog database.

Crossman, Craig, Herald Columnist; "Paying Bills can be an Electronic Task"; Miami Herald; Mar. 12, 1990; extracted on Internet from Dialog database, accession #05520522.

Shipley, Chris; "I threw away my checkbook"; PC-Computing, v3, n11, p. 112 (7), Nov. 1990; extracted on Internet from Dialog database, accession #01379643.

Steinberg, Jeffrey A.; "Checkfree"; MacUser, v6, n8, p. 68 (3), Aug. 1990; extracted on Internet from Dialog database, accession #01376772.

Lewis, Peter H.; "Personal Computers; Managing Your Money", New York times, Late Edition; Final ED, col. 5, p. 8, Aug. 29, 1989; extracted on Internet from Dialog database, accession #01871726.

Supplemental Information Disclosure Statement including declaration by Mark Johnson.

Merriam-Webster's Collegiate Dictionary, 10th edition; p. 293, word, "database" (1962); and p. 929, word, "processing" (1532).

White, et al.; "4-in-1 Accounting: The Basics from Real-World," PC Magazine, v4, n20, pp. 167-168, extracted on Internet from Dialog file 47, Accession #02746427 on Dec. 19, 2003.

Streeter, Bill, "The Future is Here and It's on TV," ABA Banking Journal, Nov. 1980, extracted from Internet from Corporate business source database on Jan. 28, 2003.

Blattberg, Robert C., Deighton, John, "Innteractive Marketing: Exploiting the Age of Addressability," Sloan Management Review, vol. 13, No. 1, Fall 1991, pp. 5-14.

Press Release, Federal Reserve System Docket No. R-0643 Regulation CC CFR Part 2 29 Availability of Funds and Collection of Checks; American Banker (pre-1997 Fulltext); New York; N.Y. Oct. 27, 1988; vol. 153, Issue. 211; extracted on Internet on Feb. 2, 2005.

Paschal, Jan; "New Edition of Rand McNally Bankers Directory Available"; Journal Record; Oklahoma City; Feb. 11, 1987, extracted on the Internet from http://proquest.umi.com on Jan. 27, 2003.

Huiyong et al., "Harcourt Brace Considers Sale of Some Assets—Chief Says Firm Discussing Potential Transactions; Thomson May Play Role", Wall Street Journal; New York; Apr. 26, 1990, extracted on the Internet from http://proquest.umi.com on Jan. 27, 2003.

Tripp, Julie, "How to Lend Uncle Sam Your Money" PAGE : B1, The Oregonian; Portland, OR; Oct. 28, 1990), extracted from http://proquest.umi.com Jul. 16, 2002.

Excerpts "Routing Symbol and Transit Number", p. 109, Chapter 6-The Payment Function by Francis et al., published by American Bankers Association in 1998, 1997, 1996, 1995, and 1994.

Offical Routing Number Registrar - Routing Number Policy formulated jointly by American Bankers Association and the Federal Reserve System in 1976, pp. 1-22.

"ABA Routing numbers", copy of web pages from www.aba.com.

Gullo, Karen, "Reistad Continues Quest for the 'Checkless Society' Series: 8, " American Banker; New York, NY, Jul. 16, 1991, vol. 156, Issue 135.

Anonymous, "Is Video Banking Poised to Take Off (Again)?", CTS Accounting Software Survey; Jun. 1990, vol. 20, Issue 1.

Tyson, David O., "Princeton Telecom Addresses Problems of On-Line Bill Payment," American Baker; New York, NY, Aug. 9, 1989.

Unknown, Excerpt from The Bankers Magazine, Jul.-Aug. 1985 pp. 54-55.

Press release, Banks, Credit Unions Join Utilities to Expand Bill Payment Plan; (Sunrise Edition) Omaha World-Herald; Omaha, Nebraska, Aug. 30, 1989, p. 19.

Howard, Bill, "The Best of 1989, " PC Magazine, Jan. 16, 1990 (excerpt).

Dunkin, Amy, "Personal Business: Software Have a PC? Now, You Can Chuck Your Checkbook," Business Week, Sep. 3, 1990.

Churbusck, David C., "Let your Fingers do the Banking," Forbes, Aug. 19, 1991.

Shipley, Chris, "CheckFree's Payment System," PC Computing, Aug. 1, 1991.

Shipley, Chris, "Electronic Bill Paying Just Got a Lot Easier," PC Computing, May 1, 1991.

Magid, Lawrence, "How to Put PC to Work Paying Bills," Los Angeles Times, Jul. 25, 1991.

Advertisement "As seen in PC Computing" with purchase order form (1989- Reprinted from PC Magazine, Nov. 14, 1989).

* cited by examiner

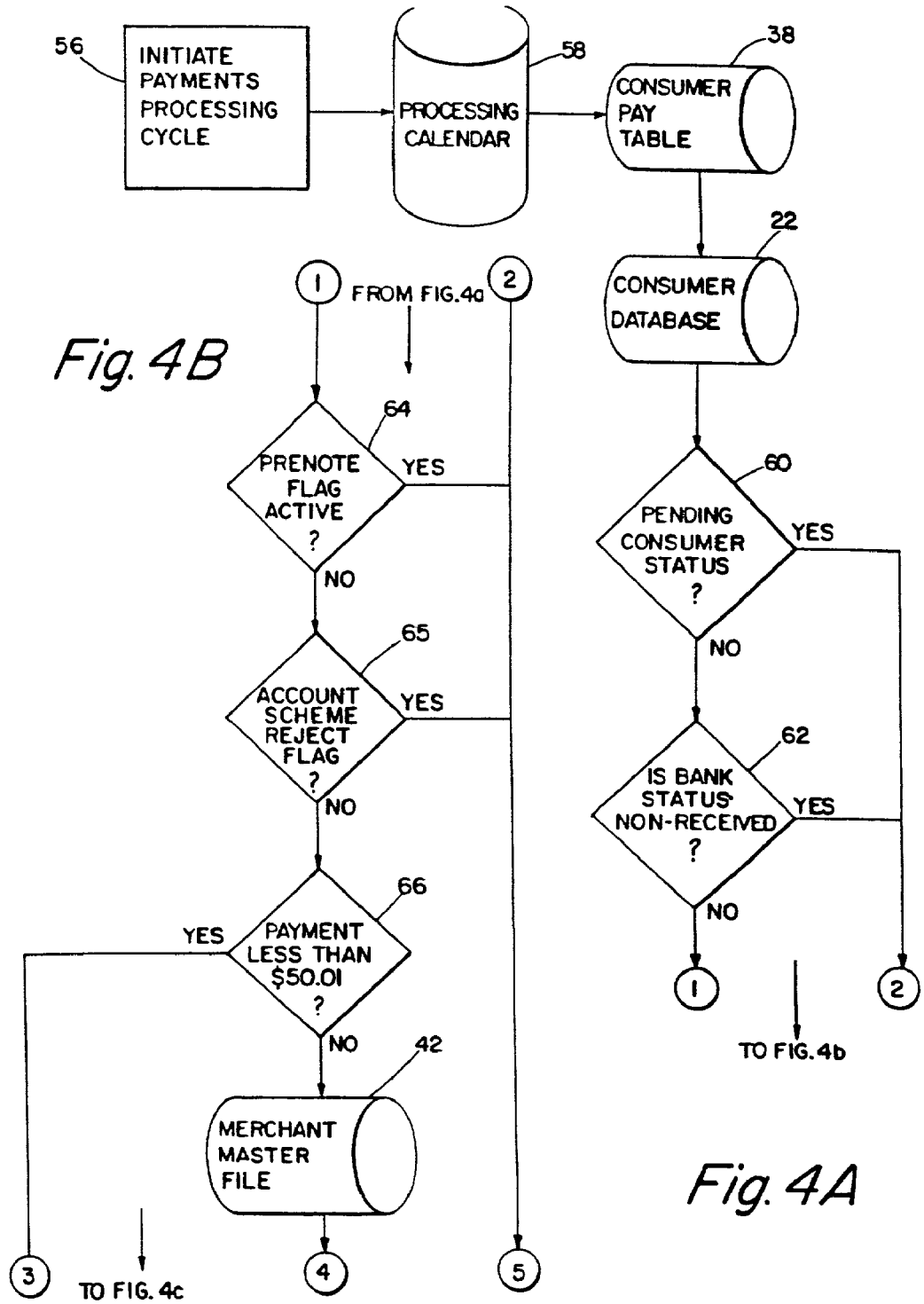

BILL PAYMENT SYSTEM AND METHOD WITH MERCHANT INFORMATION

RELATED APPLICATIONS

This application is a continuation of application Ser. No. 09/250,675 filed on Feb. 16, 1999 now abandoned.

This is a continuation of Application for U.S. Letters patent Ser. No. 08/372,620, filed Jan. 13, 1995, which will issue as U.S. Pat. No. 5,873,072 on Feb. 16, 1999, which was a continuation of application for U.S. Letters patent Ser. No. 07/736,071, filed on Jul. 25, 1991, which issued as U.S. Pat. No. 5,383,113 on Jan. 17, 1995, each having the common assignee of the present invention and each incorporated herein by reference for all purposes.

BACKGROUND AND SUMMARY OF THE INVENTION

The present invention relates generally to apparatus and methods for paying bills. More particularly, the present invention is a computerized system for paying bills whereby a consumer may contact a single source from a remote location via a telephone, a computer terminal with modem, or other electronic means, to direct the single source to pay the consumer's bills instead of the consumer writing checks for each bill. A microfiche appendix has been submitted with the parent case of this application Ser. No. 07/736,071, which issued as U.S. Pat. No. 5,383,113 on Jan. 17, 1995, which contains the program code of the present invention and which in its entirety is incorporated herein by reference. An additional hard copy of the appendix is attached as Exhibit A.

It has been common for many years for consumers to pay monthly bills by way of a personal check written by the consumer and sent by mail to the entity from which the bill or invoice was received. Consumers have used other ways to pay bills, including personally visiting the billing entity to make a cash payment. In today's economy, it is not unusual for a consumer to have several regular monthly invoices to pay. Writing individual checks to pay each invoice can be time-consuming and costly due to postage and other related expenses.

A need exists for a method whereby a consumer can contact a single source and inform the source to pay various bills of the consumer, to have the source adjust the consumer's account with the consumer's financial institution (i.e., bank, credit union, savings and loan association, etc.) to reflect a bill payment, and to actually pay the billing entity a specified amount by a particular time. The system should be efficient and not unreasonably expensive and relatively simple for a consumer to interact with. Some banks have attempted to provide a service for making payment to a few billing entities to which the banks have established relations. The banks that do provide that type of service are limited in that they provide the service only for their own customers since the banks have not developed a system for accurately acquiring and processing account numbers and balances of customers of all other banking institutions and coordinating that information with bill payment. Furthermore, banks have not developed a system for managing the risks involved in providing such a service and the inherent complexities of providing the service to consumers other than the bank's own customers. Therefore, a need exists for a single source bill payment system that would be available to any consumer, regardless of where the consumer banks and regardless of what bills are to be paid.

The present invention is designed to fulfill the above listed needs. The invention provides a universal bill payment system that works regardless of the consumer's financial institution and bill to be paid. The present invention provides a computerized system by which a consumer may pay bills utilizing the telephone, a computer terminal, or other electronic, data transmission means. Transactions are recorded against the consumer's account wherever he or she banks. The consumer may be an individual or a business, large or small. The present invention works regardless of where the consumer banks.

The method of the present invention includes: gathering consumer information and creating a master file with banking information and routing codes; inputting payment instructions by the consumer at a convenient location (e.g., at home), typically remote from the payment service provider, by using an input terminal such as a push-button telephone; applying the payment instructions to the consumer's file; using computer software of the present invention to examine various files to determine such things as what is the appropriate form of payment based on variables involving banking institutions and merchants; comparing each transaction against a dynamic credit file and routing based on set parameters; and, if the payment system determines that everything is ready for payment to be made, adjusting the consumer's account (usually by debiting) and making payment directly to the billing entity. The single source service provider for consumer bill payment could be any entity with the capability to practice the invention as described hereinafter. The foregoing and other objects and advantages will become more apparent when viewed in light of the accompanying drawings and following detailed description.

BRIEF DESCRIPTION OF THE DRAWINGS

FIG. 4a is a diagrammatical representation of a payment processing cycle;

FIG. 4b is a continuation of the diagram of FIG. 4a;

DESCRIPTION OF PREFERRED EMBODIMENT(S)

Figure 1:
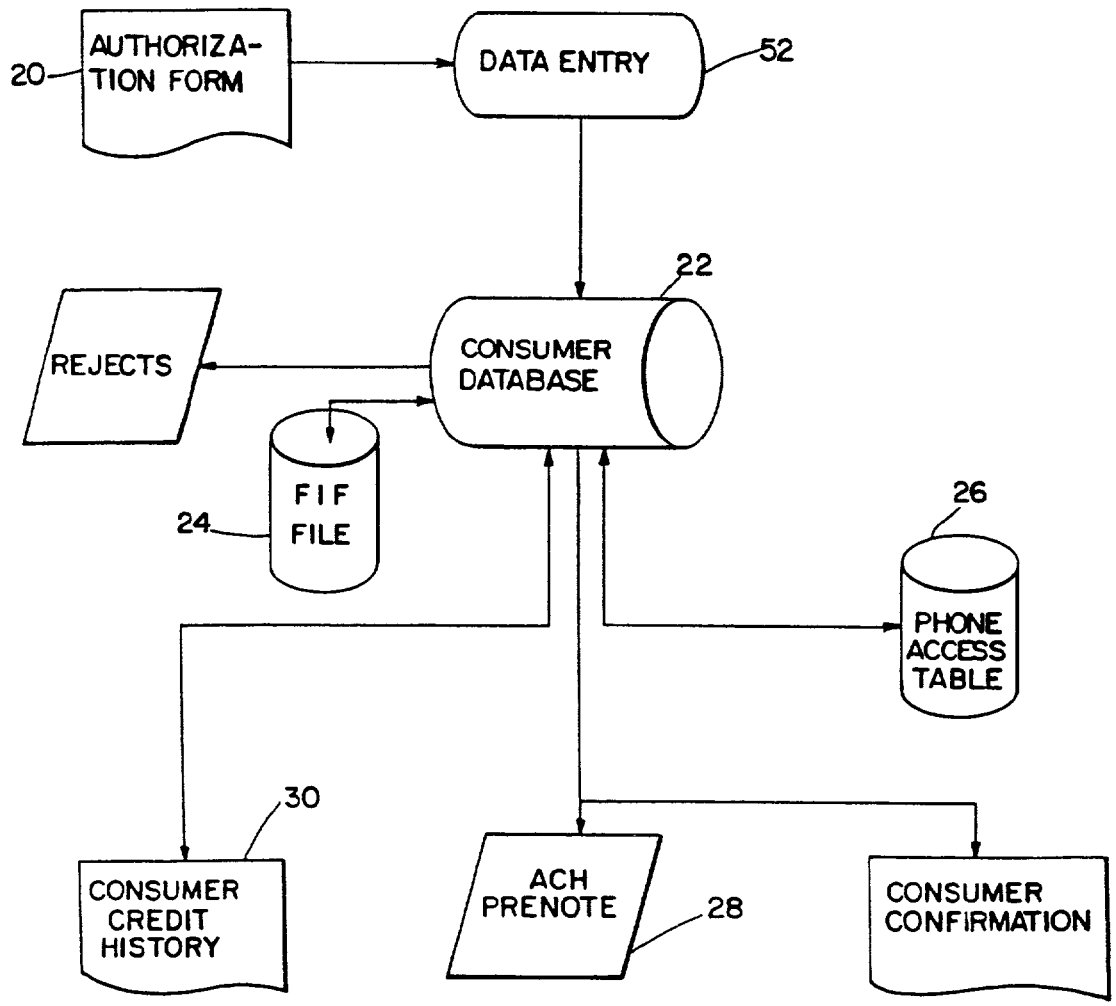
FIG. 1 is a diagrammatical representation of the creation of a consumer database.

Referring now to the drawings, FIG. 1 illustrates the steps in the creation of a consumer database for use with the present invention. The first step in the process is to establish a consumer's data records on the system. This may be accomplished by the consumer completing an authorization form 20 which would contain the needed information to input into the system concerning the consumer. This information may include the consumer's name, address, telephone number and other applicable information. The consumer would also provide a voided check from the consumer's personal checking account. The consumer's information may then be manually input via a keyboard 52 into the consumer database record 22. Default amounts may be set for an individual credit line parameter and for a total month-to-date parameter. These amounts establish the maximum unqualified credit risk exposure the service provider is willing to accept for an individual transaction and for the collective month-to-date transactions of a consumer. As explained hereinafter, the service provider may be at risk when paying a consumer's bills by a check written on the service provider's account.

From the voided check, the consumer's bank routing transit and individual account numbers at an institution are input into the computer system. This information may be edited against an internal financial institutions file (FIF) database 24 of the present invention. FIF 24 is a database of financial institutions' identification codes and account information for the consumer. This file edits the accuracy of the routing transit number and the bank account number. If the numbers do not correspond with the correct routing and bank numbers, they are rejected and the data entry is done again. FIF 24 in conjunction with the software of the present invention also updates the consumer database 22 for both electronic and paper draft routing and account information. The needed information may be obtained from each banking institution and each consumer.

The consumer is notified by the service provider of his or her local phone number access and personal security code for informing the service provider that a bill is to be paid. This information may be stored in a phone access table 26. The personal security code may be much like an ATM machine four digit code. In addition, to comply with federal law, an electronic pre-note 28 will be created to be sent to the consumer's bank to inform the bank that the service provider is authorized to debit the consumer's account. For further security to the service provider, a consumer credit record 30 may be obtained. The default credit limit amounts over which the service provider may be unwilling to assume financial risk may be modified based on the information obtained from the credit report 30.

Figure 2:
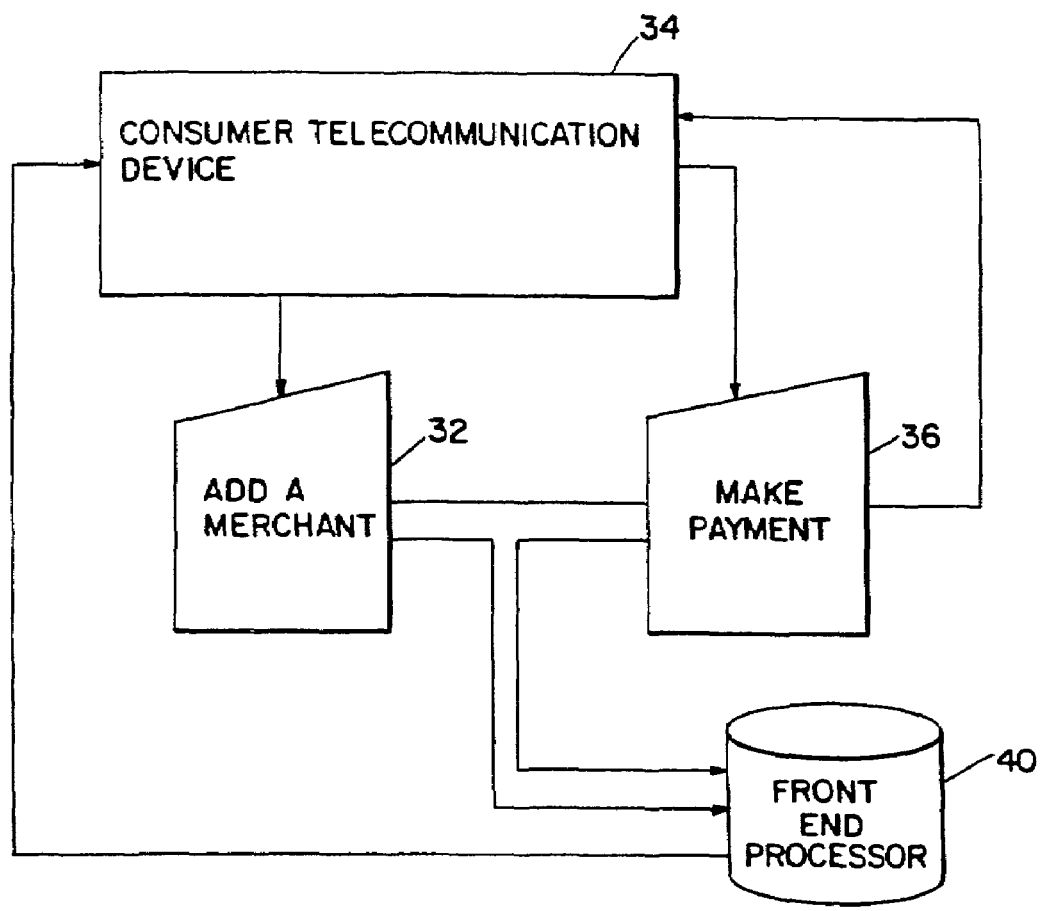
FIG. 2 is a diagrammatical representation of the establishment of a merchant's (billing entities) database and the making of payments.

In FIG. 2 the steps are shown for establishing merchants to be paid and the making of a payment. The consumer must inform the service provider or processor of a merchant's name, address, phone number and the consumer's account number with the merchant 32. The term "merchant" as used herein is intended to pertain to any person or entity that the consumer wishes to pay and is not to be limited to the usual merchants most consumers pay, such as the electric company, a home mortgage lender, etc. This information is put into a merchant master file database 42 (MMF). The consumer may also indicate whether the merchant is a variable or fixed merchant. A variable merchant is one in which the date and amount of payment will vary each month. A fixed merchant is one in which the date and amount remain the same each month. If the merchant is fixed, the frequency of payment may be other than monthly, such as weekly, quarterly, etc. The consumer should inform the service provider of the date on which the merchant is to be paid and the amount to be paid.

Through a telecommunications terminal 34 (e.g., a push-button telephone or computer terminal), a consumer may initiate payment of bills. Through the terminal, the consumer may access his merchant list and input the payment date and amount. The system may be provided with a payment date editor 36 to insure that the date is valid and logical (i.e., payment dates already in the past or possibly a year or more into the future would be questioned). As payments are initiated, a consumer "checkbook register" may be created and automatically updated to reflect this activity. The merchant list can be visible on the consumer's personal computer screen. On a personal computer a consumer may enter merchant payment amounts and payment dates on the computer screen and then transmit this information to the service provider.

By telephone, the list may be presented by programmed voice. The voice may be programmed to ask the consumer if a particular merchant (selected from the consumer's MMF, which may be updated from time to time) is to be paid and to tell the consumer to press 1 if yes, or press 2 if no. If yes, the voice may instruct the consumer to enter the amount to be paid by pressing the numbers on a touch tone phone. The asterisk button could be used as a decimal point. After the amount is entered, the voice may ask the consumer to enter the date on which payment is to be made to the merchant. This may be accomplished by assigning each month a number, such as January being month 01. The consumer may then enter month, day and year for payment. The programmed voice may be accomplished with a VRU (voice response unit) available from AT&T or other vendors. It may communicate with a data processor to obtain consumer information. At the end of the consumer's session on the terminal a confirmation number may be sent to the consumer, providing a record of the transaction.

Figure 3:
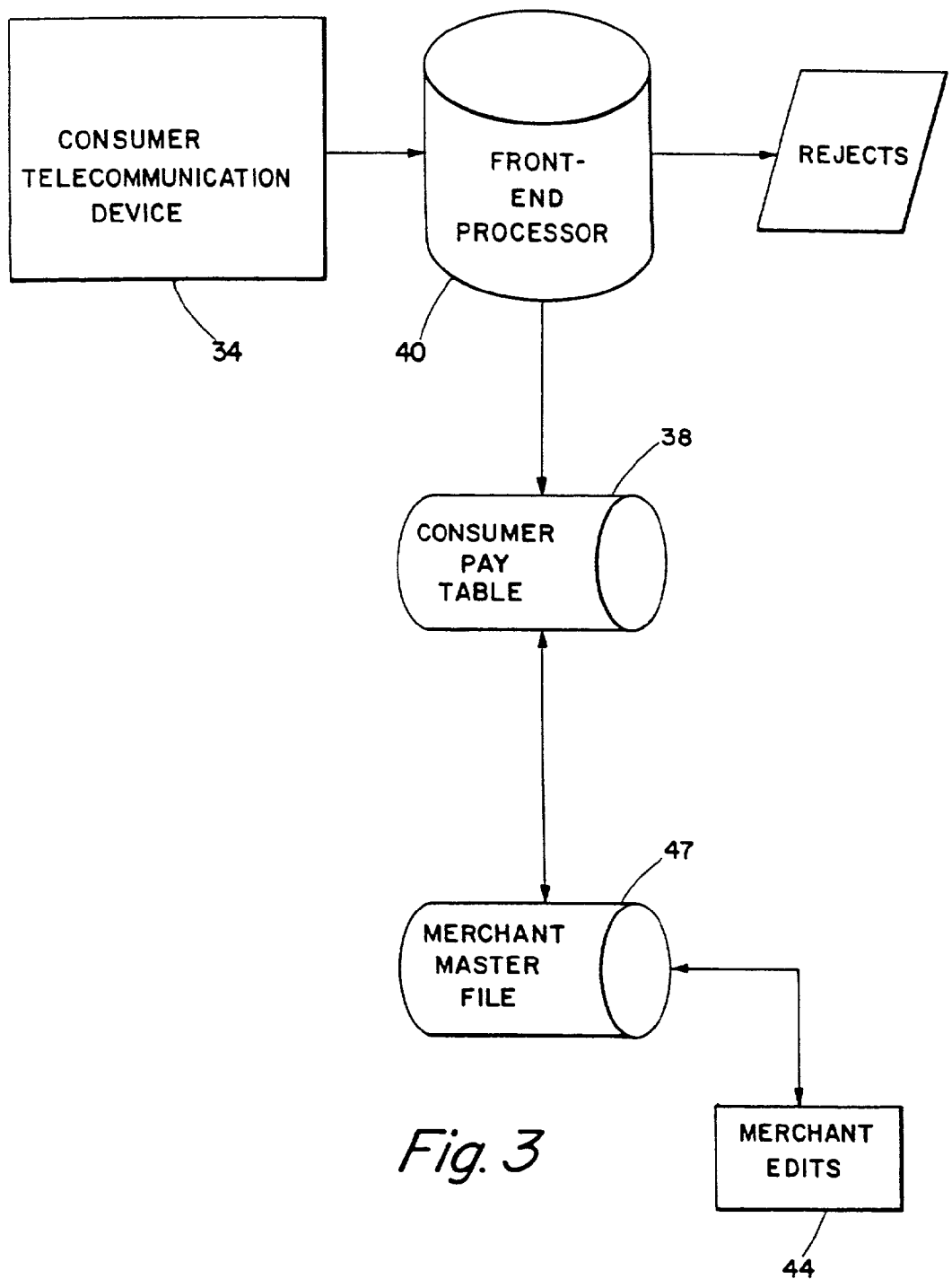
FIG. 3 is a diagrammatical representation of the creation of a consumer pay table.

In FIG. 3 the steps are shown for the creation of the consumer pay table 38 and making updates to it. The consumer's files may be received at the service provider on a front end processor 40 that interfaces with the telecommunications network. The consumer's records may be edited 44 for validity by comparing to the merchants' account scheme. Any new merchant records are added to the consumer's pay table. New merchants are compared to the MMF 42 and appropriately cross-referenced to the pay table to check if a merchant record already exists. If no merchant record exists, a merchant record will be created on the MMF 42.

Payment records may also be received on the service provider's processor. The payment may first go through a validation process against the pay table. The validation process checks for duplicate payments and if duplicates are found they are sent to a reject file. The validation process also verifies that merchants are set up and may check for multiple payments to be paid to a particular merchant. Orders for payment go to the consumer pay table to determine when the payment should be released and how it will be released for payment.

Figure 5:
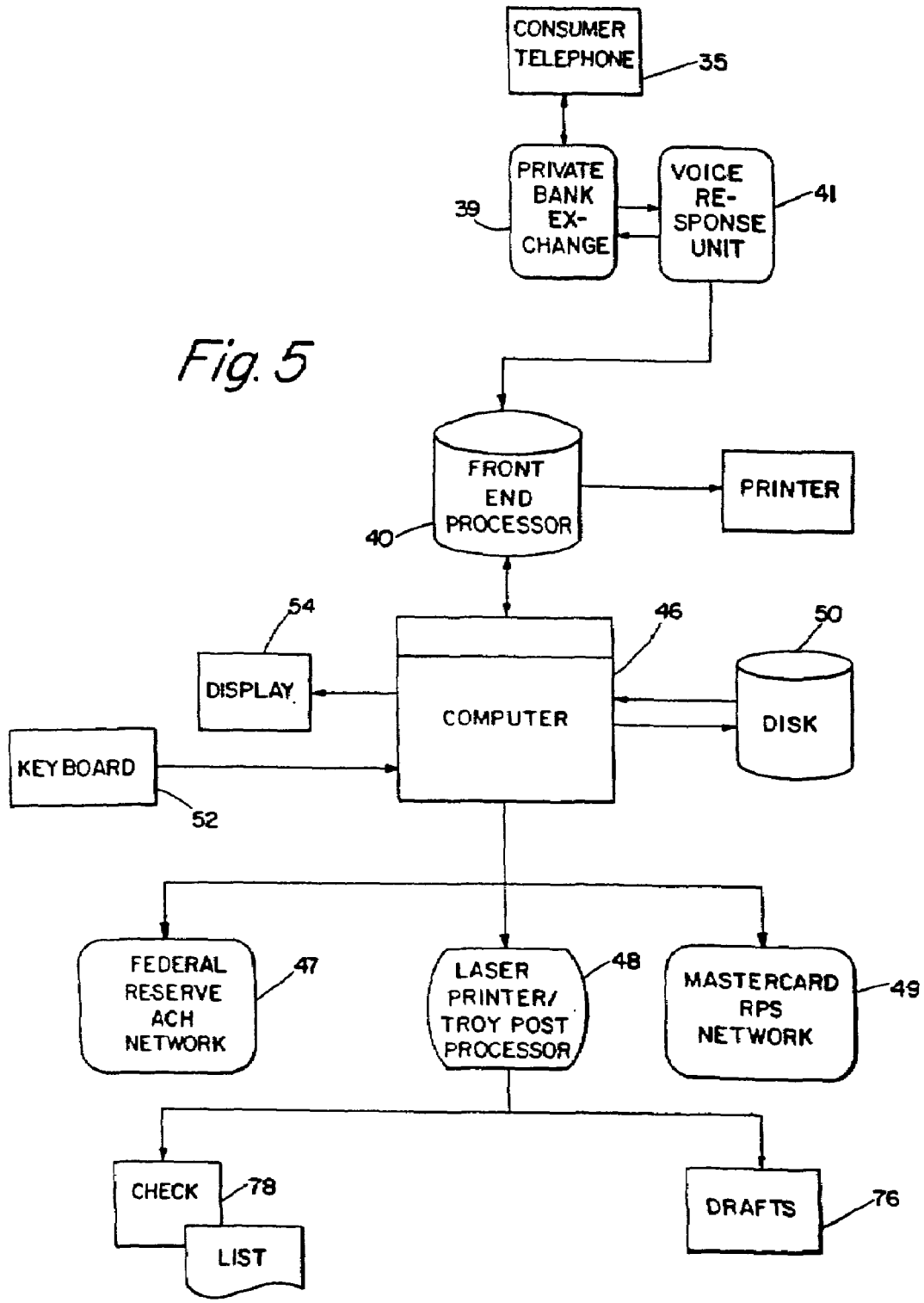
FIG. 5 is a diagrammatical representation of a computer hardware system that may be used for accomplishing the present invention.
Figure 6:
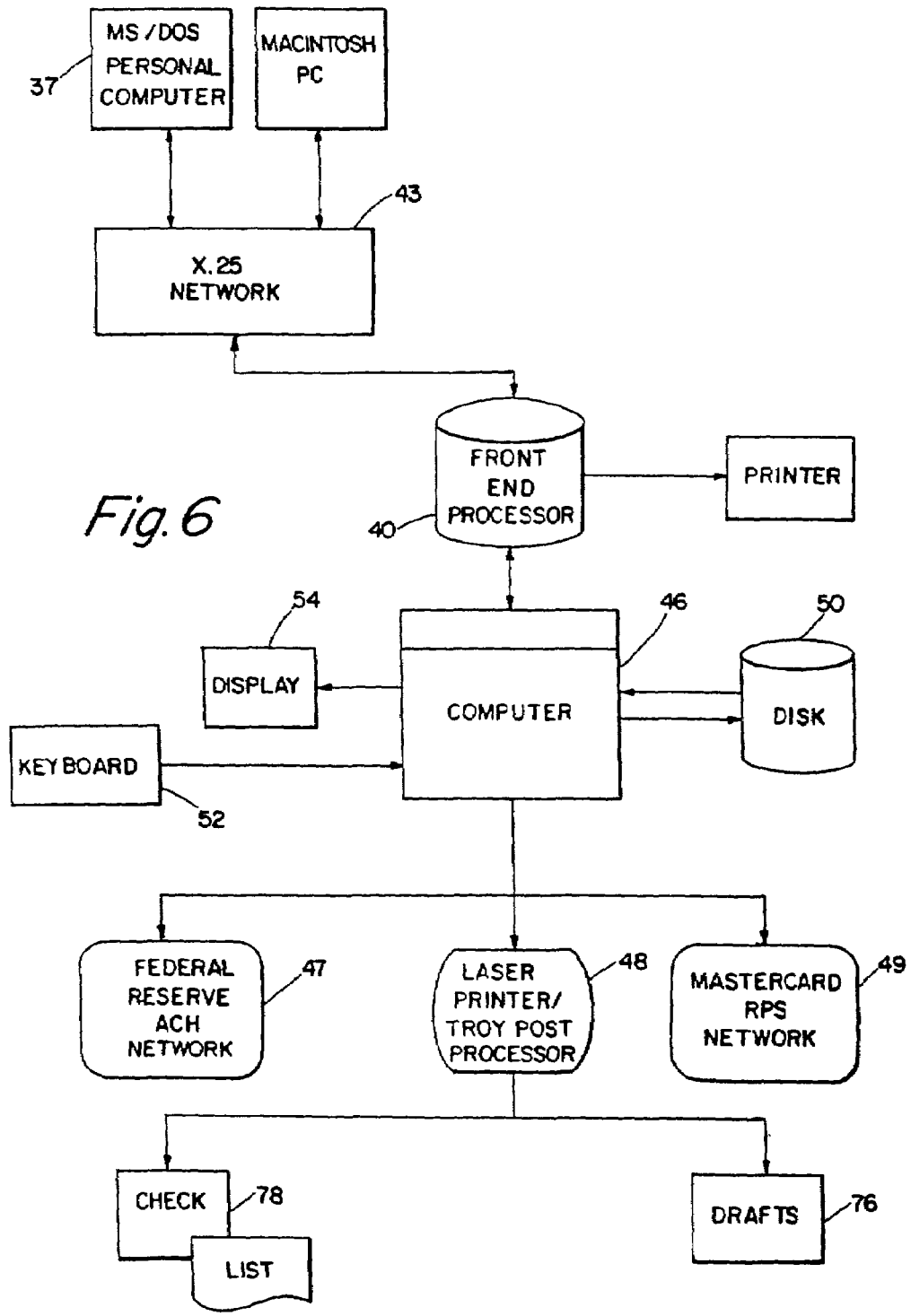
FIG. 6 is a diagrammatical representation of another computer hardware system that may be used for accomplishing the present invention.

The service provider may pay merchants by a draft or check (paper) or by electronic funds transfer. To create a draft that will pass through the banking system, it must be specially inked. This may be accomplished by a printer which puts a micr code on drafts, like standard personal checks. For example, as shown in FIG. 5, the front end processor 40 may be a DEC VAX which is connected to an IBM main frame 46 Model 4381. Consumers may call by telephone 35, a number that passes through the private bank exchange (PBX) 39 and contacts a voice response unit 41 in association with the front end processor 40. After the consumer's payment instructions are received an analysis is performed to determine the most cost effective and least risk mode of payment for the service provider to use. One preferred mode of payment is electronic funds transfer through the Federal Reserve Automated Clearing House (ACH) Network 47. If the service provider is not a bank, a bank intermediary may be needed to be connected to the Federal Reserve Network. Another payment mode is a charge to the consumer's credit card through the RPS Network 49. Additionally, an IBM Laser Printer attached to a micr post printer 48 may be used by the service provider to send drafts 76 or consolidated checks 78 to merchants. The main frame 46 has data storage means 50 and runs the FIF 24 and MMF 42 programs. It may also have a tape drive or telecommunication interface for accomplishing electronic funds transfer. It should be recognized that various other hardware arrangements could be used to accomplish the present invention. FIG. 6 illustrates a similar arrangement for use when the consumer is using a personal computer 37 to instruct the service provider. The personal computer may access the front end processor 40 through the standard X.25 Network 43.

Figure 4C:
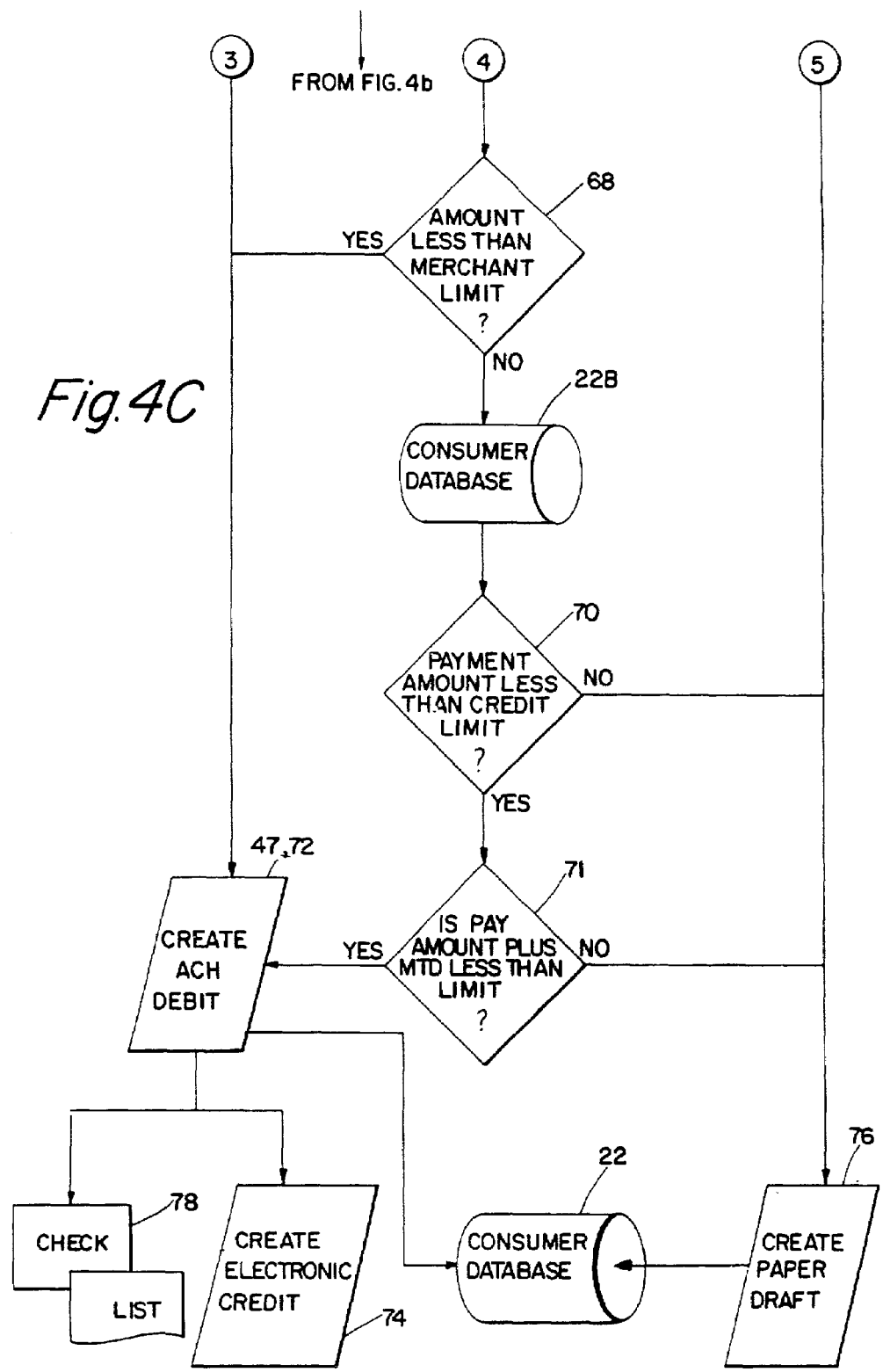
FIG. 4c is a continuation of the diagram of FIG. 4b.

Referring now to FIGS. 4*a*, 4*b* and 4*c*, the payment process is shown. The payment process may be cycled 56 each day or more or less frequently. The first step is to establish when payment items are to be processed. This may be accomplished through a processing calendar 58. A processing calendar 58 may be built into the system. The calendar 58 enables the system to consider each date, including weekends and the Federal Reserve holidays. Payments are released from the consumer pay table 38 using the due date. Any bank date, payments, or payments within a period such as four business days may be released the same day. All future payment dates would be stored in the consumer pay table 38. On-line inquiry may be made on the consumer pay table 38. The service provider has on-line capability to make changes to the consumer payment upon request until the day the payment is released. A consumer's merchant change may also affect the consumer's payment on the pay table 38.

The method of payment to the merchant may be either paper (draft or check) or electronic. There are several factors in the process used to determine if a payment will be released as a paper item, or an ACH electronic transaction (automated clearing house; service provider is a party to transaction). Each consumer may be assigned a status such as: active=good; inactive=bad; and, pending=uncertain, risky. If a consumer's status is pending 60, when reviewing the payment file with the processing calendar 58, the payment should go out as a draft paper to protect the service provider. When payment is made by draft, the service provider is not a contractual party to the transaction. The consumer's bank account codes are actually encoded onto the draft prepared by the service provider and act much like the consumer's personal check. The draft has been specially designed for this process. The draft is payable to either the service provider or the particular merchant. This allows the draft to be delivered to the merchant for payment and depositing, but allows the draft to be legally payable by the bank, with proper authorization. Additionally, posting information for the merchant is contained on the body of the draft. To the applicant's knowledge, it is the first time a draft has been used in such a manner and with this unique design to accomplish this. If the consumer's bank transit number does not indicate an electronic bank 62 (i.e., a banking institution that will accept electronic finds transfer), the program associated with FIF 24 sends the payment as a draft. A pre-note 28 is required any time 64 new banking information is entered on a consumer and the bank shows on FIF 24 as an electronic receiving bank. The pre-note period is ten (10) days under federal law. Any payments released during this period are sent as paper.

The third manner in which the service provider may pay bills is by a check written on the service provider's account. A consolidated check may be written if many customers have asked the service provider to pay the same merchant. Under this method of payment the service provider assumes some risk since the service provider writes the check on its own account. The service provider is later reimbursed by the (consumer's) banking institution.

As a means of minimizing risk to the service provider, any transaction may be compared to the MMF 42 credit limit. For example, if the check limit is greater than zero and the payment is $50.00 or less 66, the item may be released as electronic 74 or by service provider check 78. If the payment is greater than $50.00 but less than or equal to the merchant credit limit 68, the payment may be released as electronic payment 74 or check 78. Any payments within the merchant's credit limit 70 are added to the consumer's monthly ACH balance 72. This provides a monthly total billing day to billing day summary of the consumer's electronic payment activity. Any transaction may be compared to the consumer's database credit limit parameters. If a payment amount is greater than the consumer's credit limit, the item is released as a draft 76 which is written on the consumer's account. If the payment amount plus the total of electronic payments in a particular month is greater than the consumer's credit limit, the item is released as a draft 76. Items not released as paper are initiated as an ACH debit against the consumer's account.

The consumer database may be reviewed for proper electronic funds transfer (EFT) routing. Payment to the merchant may be accomplished one of three ways, depending on the merchant's settlement code. Various merchant's settlement codes may be established. For example, a merchant set up with a settlement code "01" results in a check and remittance list 78 being mailed to the merchant. Merchants with a settlement code, such as "10" produce an ACH customer initiated entry (CIE). Merchants with a settlement code, such as, "13" produce a remittance processing system (RPS) credit.

In the consumer pay table, for fixed payments, a payment date gets rolled to the next scheduled payment date on the pay table. The number of remaining payments counter is decreased by one for each fixed payment made. For variable payments once made, the payment date is deleted on the consumer pay table. The schedule date and amount on the consumer pay table roll to zero. A consumer payment history may also be provided which show items such as process date as well as collection date, settlement method, and check number in addition to merchant name and amount.

The software of the present invention is designed in part to make several decisions relating to particular transactions for consumers. The following example is provided to more fully describe the software. This example is not intended to limit the application to the details described in the example and is only provided to further enhance the description of the invention already stated above.

For this example, assume that a consumer has five transactions of varying amounts for which the consumer has asked the service provider to arrange payment. For simplicity, assume that the five payments are to be made on the same day. First, the consumer database 22 is edited to validate the status, banking institution, and pre-note flags associated with the consumer's requested payments. The account numbers provided by the consumer for the merchants to be paid, are also checked to determine if they are valid. Assuming the merchant account numbers are valid, the program begins with the first dollar analysis.

For purposes of this example, the five payments the consumer has requested are in the amounts of: $25.00; $75.00; $150.00; $250.00; and $1,000.00. The program will consider each dollar amount individually as it goes through the various edit modes. The first edit may be called a $50.01 edit. In this example, any transaction that is less than $50.01 is automatically sent as an ACH debit to the consumer's account. This means that the service provider uses ACH to electronically transfer funds from the consumer's account to the service provider's clearing account.

In this example, the initial payment of $25.00 will satisfy the $50.01 edit and therefore will be paid without any further edits being conducted for this particular payment. Continuing with the example, the next edit may be a merchant dollar edit that is established for the specific merchant to which the transaction is being sent. For purposes of this example, this edit is set at $100.00 for all merchants. Different dollar edits can be incorporated for different merchants. In the example, the second payment request of the consumer, for $75.00, meets the $100.00 merchant edit parameter and is sent as an ACH debit to the consumer's account. Note that the $75.00 payment would not have satisfied the $50.01 edit and therefore would have passed on to the second edit which in this case, is the merchant dollar edit.

The remaining three payments in the example exceed both the $50.01 edit and the merchant $100.00 edit and therefore, go to the next edit. In the example, the next edit is for a consumer individual transaction limit set at $200.00. The $150.00 payment is less than the $200.00 consumer individual transaction limit and is, therefore, sent as an ACH debit to the consumer's account and paid. The other two remaining payments yet to be made exceed the $200.00 limit in this example and pass to the next edit.

In the next edit, which happens to be the last edit in the example, the consumer's month-to-date "unqualified" risk limit is checked. In the example, the month-to-date limit is set at $1,500. Assume that for this particular consumer $400.00 of month-to-date payments have already been made on the consumer's behalf. Added to the $400.00 would be the three payments made above for $25.00, $75.00 and $150.00. So an additional $250.00 is added to the $400.00 month-to-date for a total of $650.00 "unqualified" risk for the current month-to-date amount. The next payment to be made is for $250.00 and would fall within the $1,500 month-to-date limit when added to the current $650.00 risk amount. Therefore, the $250.00 payment is made and an ACH debit is sent to the consumer's account. This brings the total month-to-date "unqualified" risk amount to $900.00. The final $1,000 payment has not been paid and would send the "unqualified" risk amount over $1,500 when added to the $900.00. Since the final payment of $1,000 in the example fails the consumer month-to-date limit edit, the $1,000 payment would be sent as a paper draft directly drawn on the consumer's account, and for which the service provider has no liability. In the example, the final step would be updating the consumer month-to-date current total to $900.00.

The apparatus for and method of bill payment of the present invention and many of its attendant advantages will be understood from the foregoing description. It will be apparent that various changes may be made in the form and steps thereof without departing from the spirit and scope of the invention or sacrificing all of its advantages.

We claim:

1. A method of generating an instruction for paying bills, comprising the steps of:
    receiving, via a network, information identifying a particular merchant in association with a request to pay a bill of the particular merchant on behalf of a consumer;
    searching a merchant database having information about each of a plurality of merchants to determine if the particular merchant is included in the merchant database;
    adding the particular merchant to the merchant database if the particular merchant is not included in the merchant database;
    associating a merchant credit limit with the particular merchant in the merchant database; and
    processing the received request to generate an instruction to pay the bill in accordance with the merchant credit limit.

2. The method of claim 1, wherein the information identifying the particular merchant includes a merchant account number associated with the consumer, further comprising the step of:
    adding the merchant account number associated with the consumer to the merchant database if the particular merchant is not included in the merchant database.

3. The method of claim 1, wherein the information identifying the particular merchant includes at least one of an address associated with the particular merchant and a phone number associated with the particular merchant, further comprising the step of: adding the at least one of an address associated with the particular merchant and a phone number associated with the particular merchant to the merchant database if the particular merchant is not included in the merchant database.

4. An article of manufacture for generating an instruction for paying bills, comprising:
    a computer readable medium; and
    computer programming stored on the computer readable medium wherein the stored computer programming is configured to be readable from the computer readable medium by a computer to thereby cause the computer to operate so as to:
    receive, via a network, information identifying a particular merchant in association with a request to pay a bill of the particular merchant on behalf of a consumer;
    search a merchant database having information about each of a plurality of merchants to determine if the particular merchant is included in the merchant database;
    add the particular merchant to the merchant database if the particular merchant is not included in the merchant database;
    associate a merchant credit limit with the particular merchant in the merchant database; and
    process the received request to generate an instruction to pay the bill in accordance with the merchant credit limit.

5. The article of manufacture according to claim 4, wherein the information identifying a particular merchant includes a merchant account number associated with the consumer, the computer readable medium is further readable to cause the computer to:
    add the merchant account number associated with the consumer to the merchant database if the particular merchant is not included in the merchant database.

6. The article of manufacture according to claim 4, wherein the information identifying the particular merchant includes at least one of an address associated with the particular merchant and a phone number associated with the particular merchant, the computer readable medium is further readable to cause the computer to:
    add the at least one of an address associated with the particular merchant and a phone number associated with the particular merchant to the merchant database if the particular merchant is not included in the merchant database.

7. A system for processing a request to pay a bill, comprising:
an input port for receiving, via a network, information identifying a particular merchant in association with a request to pay a bill of the particular merchant on behalf of a consumer;
a merchant database storing merchant information about each of a plurality of merchants, wherein for at least one of the plurality of merchants the merchant information includes a merchant credit limit; and
a first processor configured to search the merchant database to determine if the particular merchant is included in the merchant database, and to add the particular merchant to the merchant database if the particular merchant is not included in the merchant database.

8. The system of claim 7, wherein the information identifying the particular merchant includes a merchant account number associated with the consumer, the first processor is further configured to add the merchant account number associated with the consumer to the merchant database if the particular merchant is not included in the merchant database.

9. The system of claim 7, wherein the information identifying the particular merchant includes at least one of an address associated with the particular merchant and a phone number associated with the particular merchant, the first processor is further configured to add the at least one of an address associated with the particular merchant and a phone number associated with the particular merchant to the merchant database if the particular merchant is not included in the merchant database.

10. The system of claim 7, further including a second processor configured to process the received request to generate an instruction to pay the bill.

11. The method of claim 1, wherein the information identifying the particular merchant includes a merchant account number associated with the consumer, and wherein the step of processing the received request includes validating the merchant account number based at least in part on an account scheme associated with the particular merchant.

12. The article of manufacture according to claim 4, wherein the information identifying a particular merchant includes a merchant account number associated with the consumer, and wherein the computer readable medium is further readable to cause the computer to validate the merchant account number based at least in part on an account scheme associated with the particular merchant.

13. The system of claim 7, wherein the first processor is further configured to process the received request to generate an instruction to pay the bill.

14. The system of claim 10, wherein the information identifying the particular merchant includes a merchant account number associated with the consumer, and wherein the second processor is further configured to validate the merchant account number based at least in part on an account scheme associated with the particular merchant.

15. The system of claim 13, wherein the information identifying the particular merchant includes a merchant account number associated with the consumer, the first processor is further configured to validate the merchant account number based at least in part on an account scheme associated with the particular merchant.

* * * * *